United States Patent [19]
Tanaka et al.

[11] Patent Number: 5,574,096
[45] Date of Patent: Nov. 12, 1996

[54] GAS BARRIER FILM AND PRODUCTION PROCESS THEREOF

[75] Inventors: Hideaki Tanaka; Hiroyuki Oba, both of Ibaraki-ken; Kazuhiko Hirose, Chiba-ken, all of Japan

[73] Assignee: Kureha Kagaku Kogyo K.K., Tokyo, Japan

[21] Appl. No.: 310,749

[22] Filed: Sep. 22, 1994

[30] Foreign Application Priority Data

Sep. 27, 1993 [JP] Japan ................................. 5-262958

[51] Int. Cl.$^6$ ............................. C08L 29/04; C08L 33/02
[52] U.S. Cl. ............................................. 525/57; 525/221
[58] Field of Search ........................................ 525/57, 221

[56] References Cited

U.S. PATENT DOCUMENTS

| | | | |
|---|---|---|---|
| 2,169,250 | 8/1939 | Izard | 18/54 |
| 3,133,865 | 5/1964 | Richardson et al. | 167/87.1 |
| 4,320,040 | 3/1982 | Fujita et al. | 524/459 |

FOREIGN PATENT DOCUMENTS

| | | |
|---|---|---|
| 63-47743 | 9/1988 | Japan. |
| 2-14376 | 4/1990 | Japan. |
| 2-27941 | 6/1990 | Japan. |

*Primary Examiner*—W. Robinson H. Clark
*Attorney, Agent, or Firm*—Lowe, Price, LeBlanc & Becker

[57] ABSTRACT

Disclosed herein is a gas barrier film formed from a mixture containing polyvinyl alcohol and a partially neutralized product of poly(meth)acrylic acid in a weight ratio of 95:5 to 10:90, and having an oxygen permeability constant of $1.25 \times 10^{-3}$ ml(STP)·cm/m$^2$·h·atm{Pa} or smaller as measured under conditions of 30° C. and 80% relative humidity. A production process of the gas barrier film, in which a film formed from a mixture containing polyvinyl alcohol and a partially neutralized product of poly(meth)acrylic acid is subjected to a heat treatment under specific conditions, is also disclosed. The gas barrier film of the invention is excellent in water resistance and oxygen gas barrier property, free of any chlorine atom, and scarcely colored.

21 Claims, 1 Drawing Sheet

GAS BARRIER FILM AND PRODUCTION PROCESS THEREOF

FIELD OF THE INVENTION

The present invention relates to gas barrier films, and more particularly to films which are formed from a mixture containing polyvinyl alcohol (PVA) and a partially neutralized product of poly(meth)acrylic acid, insoluble in water, excellent in oxygen gas barrier property, and scarcely colored, and a production process thereof. The films according to the present invention are excellent in water resistance and oxygen gas barrier property and free of any chlorine atom, and are hence suitable for use as food packaging materials and the like.

BACKGROUND OF THE INVENTION

A PVA film is generally formed by a casting process making use of water as a solvent, or an extrusion process. The PVA film features that it is flexible and antistatic, and moreover has the best oxygen gas barrier property among general synthetic resin films in a dry state. Therefore, the use of the PVA film has heretofore been intended to develop to the field of packaging materials, for which good oxygen gas barrier property is required, making good use of this gas barrier property. However, the oxygen gas barrier property of the PVA film greatly depends on humidity and are hence impaired to a great extent due to moisture absorption under high-humidity conditions. Further, the PVA film is easy to dissolve in boiling water.

A PVA film has hitherto been used in the form of a laminate film of a multi-layer structure having at least two layers of the PVA film and another film when using it for a purpose in which practical oxygen gas barrier property is required, whereby the influence of humidity has been lessened as much as possible. In the method forming the laminate film, however, moisture resistance and water resistance are still insufficient. There are thus demands for improving the water resistance of the PVA itself and allowing the PVA film to satisfactorily keep the good oxygen gas barrier property even under high-humidity conditions.

In order to solve the above problems involved in the PVA film, various investigations such as, for example, those described below have heretofore been made.

(1) To impart water resistance by chemical modification of hydroxyl groups in PVA:

It has been known to convert hydroxyl groups in PVA into a form of acetal with aldehydes. However, this method has a disadvantage that although water insolubility can be imparted to PVA, the oxygen gas barrier property of the resulting films is markedly lowered if absorbing water.

In U.S. Pat. No. 2,169,250, it has been proposed to form films, fibers and the like from an aqueous mixture solution containing PVA and a polycarboxylic acid, and heat the formed products to react the hydroxyl groups in PVA with the polycarboxylic acid so as to form a crosslinked structure, whereby the formed products are made insoluble in water.

(2) To impart water resistance by heat treatment:

A PVA film tends to crystallize by heat treatment, so that its water resistance is improved. In addition, biaxial stretching of the PVA film can facilitate its orientation and crystallization, and moreover improve its mechanical properties. Therefore, it has been known to subject a PVA film to biaxial stretching and heat treatment, thereby improving its water or moisture resistance. However, this method has a disadvantage that although water insolubility can be imparted to the PVA film, the oxygen gas barrier property of the film is markedly lowered if absorbing water. In particular, the film undergoes deformation and changes in physical properties due to moisture absorption under high-humidity conditions.

(3) To impart water resistance by polyvinylidene chloride latex coat:

It has been known to coat a PVA film with a polyvinylidene chloride latex so as to impart moisture resistance to the PVA film. However, chlorine gas attributable to chlorine in the polyvinylidene chloride generates upon its incineration in waste treatment, and this method hence involves a problem from the viewpoint of environment.

(4) To impart water resistance by copolymerization:

When a copolymer of ethylene and vinyl acetate is hydrolyzed, an ethylene-vinyl alcohol copolymer (EVOH) is obtained. An EVOH film is a film combining good oxygen gas barrier property which is a feature of PVA films with properties inherent in thermoplastic films. However, the oxygen gas barrier property of the EVOH film greatly depends on humidity. The improvement in prevention against the reduction of the oxygen gas barrier performance due to moisture absorption is not yet sufficiently made.

As described above, the conventional measures for imparting water resistance to PVA films are still insufficient from the viewpoint of keeping the excellent oxygen gas barrier performance of the PVA films under dry conditions even under conditions of high humidity or high temperature and humidity.

On the other hand, there have been proposed films and sheets making use of a mixture of PVA and polyacrylic acid (for example, Japanese Patent Publication Nos. 47743/1988, 14376/1990 and 27941/1990). These films and sheets all are water-soluble or water-absorbable and not films having good water resistance and oxygen gas barrier property.

Incidentally, the above-described U.S. Pat. No. 2,169,250 also discloses the use of polymethacrylic acid or polyacrylic acid as the polycarboxylic acid for reacting with PVA. As a specific example thereof, it is described to polymerize a methacrylic acid monomer in a solution of PVA in water, cast the resulting reaction mixture on a support, evaporate the water, and then heat the dry film for 5 minutes at 140° C., thereby reacting PVA with polymethacrylic acid to obtain a water-insoluble film (Example I). According to the results of an investigation by the present inventors, however, any film exhibiting excellent oxygen gas barrier property under high-humidity conditions can not be obtained by this heat treatment conditions. Besides, even if other specific heat treatment conditions (Examples II–V) described in this document are applied, any film exhibiting excellent oxygen gas barrier property under high-humidity conditions can not be obtained from a mixture of PVA and poly(meth)acrylic acid.

Polyacrylic acid or partially neutralized products thereof are water-soluble polymers and widely used as water-absorbing materials, thickeners, flocculants, dispersants, treating agents for paper and fibers, and the like, making good use of their hydrophilic nature. The polyacrylic acid or partially neutralized products thereof may be formed into films from their solutions by a casting process. The resultant films are excellent in oxygen gas barrier property under dry conditions. However, these films are unsuitable for packaging of food containing a great amount of water because they show strong hydrophilic nature.

OBJECTS AND SUMMARY OF THE INVENTION

It is an object of the present invention to provide a film having good water resistance and exhibiting far excellent oxygen gas barrier property under high-humidity conditions and inhibited coloring.

The present inventors previously found that when a film is formed from a mixture containing PVA and poly(meth)acrylic acid, for example, by casting an aqueous solution of the mixture on a support and then drying the resulting film, and the dry film is subjected to a heat treatment under specific conditions, a film exhibiting remarkably improved oxygen gas barrier property even under high-humidity conditions to say nothing of dry conditions compared with a film made of PVA alone, and having excellent water resistance can be obtained, and filed an application for patent (U.S. patent application No. 08/185,353). This film contains no chlorine atom and hence does not generate chlorine gas upon its incineration.

However, since the film shows a tendency to color by a heat treatment, it is required to improve such a tendency for use as a food packaging material or the like. Accordingly, the present inventors have carried out a further investigation. As a result, it has been found that when a partially neutralized product of poly(meth)acrylic acid is used in place of the poly(meth)acrylic acid in the above-described film, the coloring due to the heat treatment is markedly inhibited. Besides, it has also been found that when the mixing ratio between both polymer components, PVA and the partially neutralized poly(meth)acrylic acid, and the degree of neutralization of the poly(meth)acrylic acid are suitably selected, a film obtained by heat-treating a film formed of a mixture of PVA and the partially neutralized poly(meth)acrylic acid exhibits more improved oxygen gas barrier property.

The present invention has been led to completion on the basis of these findings.

According to the present invention, there is thus provided a gas barrier film formed from a mixture containing polyvinyl alcohol and a partially neutralized product of poly(meth)acrylic acid in a weight ratio of 95:5 to 10:90, and having an oxygen permeability constant of $1.25 \times 10^{-3}$ ml(STP)·cm/m²·h·atm{Pa} or smaller as measured under conditions of 30° C. and 80% relative humidity.

According to the present invention, there is also provided a process for the production of a gas barrier film, which comprises forming a film from a mixture containing polyvinyl alcohol and a partially neutralized product of poly(meth)acrylic acid in a weight ratio of 95:5 to 10:90, and then subjecting the film to a heat treatment under conditions in which the heat-treating temperature and the heat-treating time satisfy the following relationships (a) and (b):

(a) $\log t \geq -0.0582 \times T + 26.06$ (b) $373 \leq T \leq 573$ wherein t means the heat-treating time (min), and T denotes the heat-treating temperature (K).

DETAILED DESCRIPTION OF THE INVENTION

Figure 1:
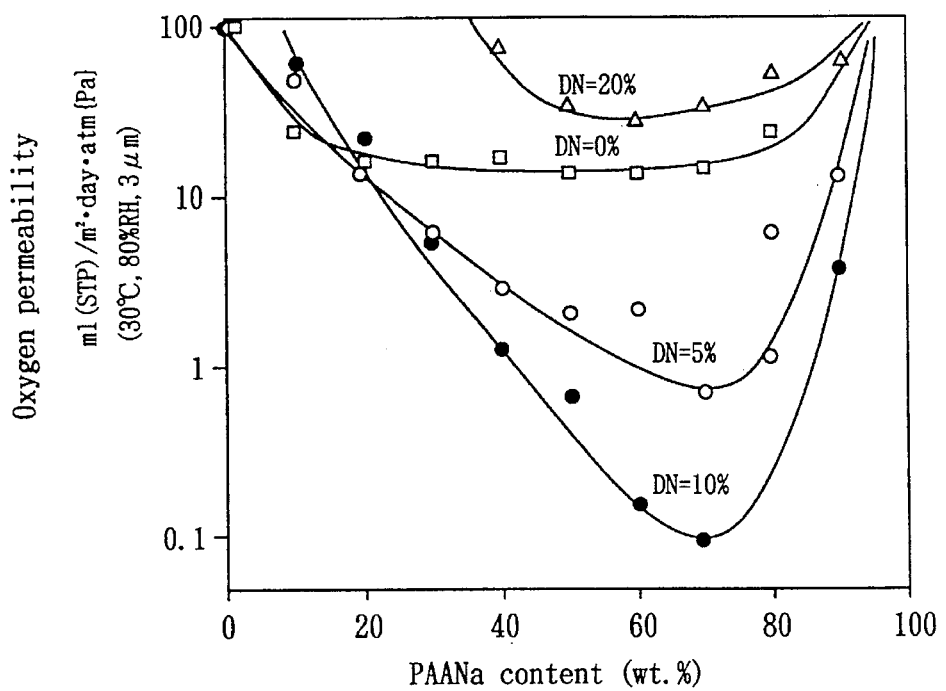
FIG. 1 is a graph showing a relationship between the content of a partially neutralized product of polyacrylic acid (PAA) and oxygen permeability as to heat-treated films obtained with the mixing ratio of PVA to the partially neutralized product of PAA and the degree of neutralization of the partially neutralized product separately varied.

The present invention will hereinafter be described in detail.

The PVA useful in the practice of the present invention desirably has a saponification degree of generally at least 95%, preferably at least 98%, and an average polymerization degree of generally 300–2,500, preferably 300–1,500.

In the present invention, a partially neutralized product of poly(meth)acrylic acid is used. The poly(meth)acrylic acid is polyacrylic acid, polymethacrylic acid, a copolymer of acrylic acid and methacrylic acid, or a mixture thereof and has at least two carboxyl groups in its molecule. Preferable examples thereof may include homopolymers of acrylic acid or methacrylic acid, and copolymers thereof. The poly(meth)acrylic acid preferably has a number average molecular weight ranging from 2,000 to 250,000.

The partially neutralized poly(meth)acrylic acid can be obtained by partially neutralizing the carboxyl groups of the poly(meth)acrylic acid with an alkali (namely, forming a carboxylate). As examples of the alkali, may be mentioned sodium hydroxide, lithium hydroxide, potassium hydroxide and ammonia (including aqueous ammonia). The partially neutralized product can be generally obtained by adding the alkali to an aqueous solution of the poly(meth)acrylic acid. A desired degree of neutralization can be achieved by controlling the quantitative ratio of the poly(meth)acrylic acid to the alkali.

The degree of neutralization of the partially neutralized poly(meth)acrylic acid is preferably selected on the basis of the degrees of oxygen gas barrier property and coloring of the resulting film. The degree of coloring of the resulting film is more improved as the degree of neutralization becomes high. However, the oxygen gas barrier property shows a tendency to deteriorate when the degree of neutralization increases beyond a certain point.

It has been revealed that although the oxygen gas barrier property of the film according to the present invention is affected by heat-treating conditions and the mixing ratio between both polymer components, it is also influenced by the degree of neutralization of the poly(meth)acrylic acid. More specifically, in a case where the degree of neutralization is 20% or lower, a film exhibiting oxygen gas barrier property corresponding to the oxygen permeability at 30° C. and 80% relative humidity (RH) of a heat-treated film (thickness: 3 μm) formed of PVA alone, or more improved compared with the simple PVA film can be obtained by selecting the heat-treating conditions and mixing ratio between both polymer components. In a case where the degree of neutralization exceeds 20%, however, the oxygen gas barrier property of the resulting film is lowered. In particular, in a case where the degree of neutralization of the partially neutralized poly(meth)acrylic acid is 15% or lower, films markedly improved in oxygen gas barrier property compared with the case making use of unneutralized poly(meth)acrylic acid can be provided in a wide range of the mixing ratio between both polymer components. It is therefore desirable that the degree of neutralization of the partially neutralized poly(meth)acrylic acid be generally 20% or lower, preferably 15% or lower from the viewpoint of the improvement in oxygen gas barrier property.

Besides, the partial neutralization of the poly(meth)acrylic acid can inhibit coloring of the resulting film in addition to the improvement in oxygen gas barrier property in the case where the degree of neutralization is 20% or lower. Therefore, the degree of neutralization is desirably selected from the range of preferably 0.1–20%, more preferably 1–20%, most preferably 3–15%.

The degree of neutralization is determined by the following equation:

Degree of neutralization=(A/B)×100 wherein A means the total number of moles of carboxyl groups neutralized in 1 g of the partially neutralized poly(meth)acrylic acid, and B denotes the total number of moles of carboxyl groups in 1 g of the poly(meth)acrylic acid before the partial neutralization.

A mixed system of the PVA having a high saponification degree and the partially neutralized poly(meth)acrylic acid is excellent in compatibility, and can provide an intimate mixture solution, for example, when dissolved in water. Processes for forming a film from a mixture of these components include a process (solvent casting) in which an aqueous solution of the mixture is cast on a support such as a glass plate or plastic film, and the mixture is dried to form a film, a process (extrusion) in which a liquid with the mixture dissolved in water in a high concentration is cast by an extruder in the form of a film through a thin slit while applying a discharge pressure, and the resulting water-containing film is dried on a rotating drum or belt, and the like. Of these film-forming processes, the solvent casting process is preferred because a dry film excellent in transparency can be obtained with ease.

In order to obtain a mixture of the PVA and the partially neutralized poly(meth)acrylic acid, there is used a method in which the respective polymers are dissolved in water, a method in which aqueous solutions of the respective polymers are mixed, a method in which a (meth)acrylic acid monomer is polymerized in an aqueous solution of the PVA, and the resulting polymer is then neutralized with an alkali, or the like. The mixture may be obtained by using solvents other than water. In the case where the solvent casting process is used, the concentration of the polymer mixture is generally adjusted to about 5–30 wt. %. When the aqueous solution or the liquid with the mixture dissolved in water in a high concentration is prepared, solvents other than water, such as alcohol, flexibilizers, and the like may suitably be added if desired. No particular limitation is imposed on the thickness of the film, and it may hence be suitably determined as necessary for the end application intended. However, it may be generally of the order of 0.1–500 μm, preferably 0.5–100 μm.

In Table 1 which will be described subsequently, are shown data obtained by measuring oxygen permeabilities of films (thickness: 3 μm) under conditions of 30° C. and 80% RH, which have been obtained by separately changing the degree of neutralization of the partially neutralized product of polyacrylic acid (PAA) and the mixing ratio of the PVA to the partially neutralized product to provide dry films of various compositions according to the solvent casting process, and subjecting them to a heat treatment at 200° C. for 15 minutes. The data are also graphically illustrated in FIG. 1. As apparent from Table 1 and FIG. 1, it is understood that when the degree of neutralization of the partially neutralized PAA is 20% or lower, preferably 15% of lower, and the content of such a partially neutralized product falls within a range of 5–90 wt. %, preferably 10–90 wt. %, more preferably 20–80 wt. %, films exhibiting excellent oxygen gas barrier property under high-humidity conditions compared with a film formed of PVA alone can be provided.

Besides, the films according to the present invention are more markedly improved in oxygen permeability under conditions of 80% RH (30° C.) or 100% RH (30° C.) as the mixing proportion of the partially neutralized poly(meth)acrylic acid increases. More specifically, as shown in Table 2 which will be described subsequently, films exhibiting excellent oxygen gas barrier property even under high-humidity conditions as severe as 80% RH (30° C.) or 100% RH (at 30° C.) can be provided if the mixing ratio by weight of the PVA to the partially neutralized product (degree of neutralization: 10%) of polyacrylic acid falls within a range of from 90:10 to 10;90, preferably from 80:20 to 20:80.

From these experimental data, the mixing ratio by weight of the PVA to the partially neutralized poly(meth)acrylic acid must be controlled to 95:5 to 10:90, preferably 90:10 to 10:90, more preferably 80:20 to 20:80 from the viewpoint of the improvement in oxygen gas barrier property.

In order to obtain a film having excellent water resistance and oxygen gas barrier property from a mixture of PVA and the partially neutralized poly(meth)acrylic acid, it is necessary to conduct a heat treatment under specific conditions after the formation of a film. In Table 4 which will be described subsequently, are shown data obtained by measuring oxygen permeabilities (at 30° C., 80% RH) of heat-treated films, which have been obtained by forming dry films (thickness: 3 μm) from an aqueous solution of a mixture of the PVA and the partially neutralized polyacrylic acid (degree of neutralization: 10%) in a weight ratio of 30:70 by the solvent casting process and separately subjecting the dry films to a heat treatment with heat-treating temperature and heat-treating time varied. The data are also graphically illustrated in FIG. 2.

Figure 2:
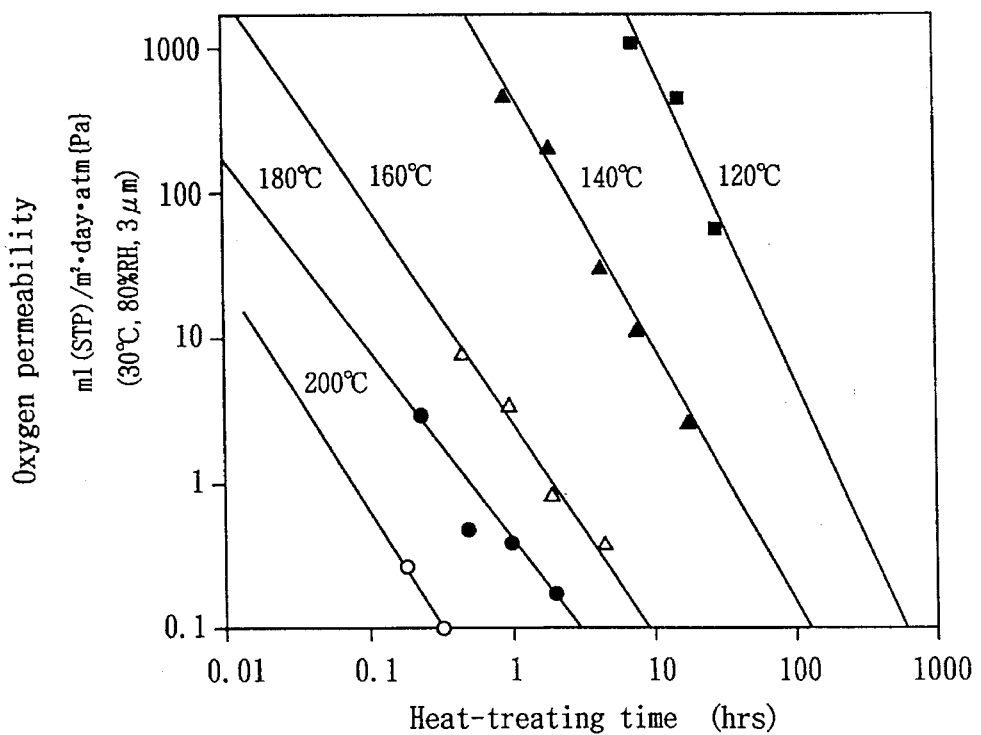
FIG. 2 is a graph showing a relationship among heat-treating temperature, heat-treating time and oxygen permeability as to heat-treated films obtained with the heat-treating temperature varied and formed from a mixture of PVA and a partially neutralized product of PAA.

As apparent from FIG. 2, when a film low in oxygen permeability is intended to form, the treating time may be relatively short if the heat-treating temperature is high. However, it takes longer time as the heat-treating temperature becomes low. A heat-treated film (thickness: 3 μm) formed of the PVA alone has an oxygen permeability (at 30° C., 80% RH) of about 100 ml(STP)/m$^2$·day·atm{Pa}. This oxygen permeability corresponds to an oxygen permeability constant of $1.25 \times 10^{-3}$ ml(STP)·cm/m$^2$·h·atm{Pa}. Therefore, the arrangement of the experimental data on the heat-treating temperature, heat-treating time and oxygen permeability has revealed that in order to have the oxygen permeability of a film formed from a mixture of the PVA and the partially neutralized poly(meth)acrylic acid more improved than a film formed of the PVA alone, the film of the mixture must be subjected to a heat treatment under conditions in which the heat-treating temperature and the heat-treating time satisfy the following relationships (a) and (b) :

(a) $\log t \geq -0.0582 \times T + 26.06$ (b) $373 \leq T \leq 573$ wherein t means the heat-treating time (min) and T denotes the heat-treating temperature (K).

The use of these heat-treating conditions permits the provision of a film formed from a mixture of the PVA and the partially neutralized poly(meth)acrylic acid, and having excellent oxygen gas barrier property as demonstrated by an oxygen permeability constant of $1.25 \times 10^{-3}$ ml(STP)·cm/ m²·h·atm{Pa} or smaller as measured under conditions of 30° C. and 80% RH.

In the present invention, to achieve a preferable oxygen permeability of 50 ml(STP)/m²·day·atm{Pa} or lower as measured under conditions of 30° C. and 80% RH (film thickness: 3 μm), it is only necessary to use heat-treating conditions satisfying the following relationship (c) in place of those satisfying the relationship (a):

(c) log t ≧ −0.0564×T+25.53 wherein T satisfies the relationship (b).

The use of the heat-treating conditions satisfying the relationship (c) permits the provision of a film having an oxygen permeability constant (at 30° C., 80% RH) of $6.25 \times 10^{-4}$ ml(STP)·cm/m²·h·atm{Pa} or smaller.

Similarly, to achieve a more preferable oxygen permeability of 25 ml(STP)/m²·day·atm{Pa} or lower as measured under conditions of 30° C. and 80% RH (film thickness: 3 μm), it is only necessary to use heat-treating conditions satisfying the following relationship (d) in place of those satisfying the relationship (a):

(d) log t ≧ −0.0547×T+25.00.

wherein T satisfies the relationship (b).

The use of the heat-treating conditions satisfying the relationship (d) permits the provision of a film having an oxygen permeability constant (at 30° C., 80% RH) of $3.13 \times 10^{-4}$ ml(STP)·cm/m²·h·atm{Pa} or smaller.

Further, to achieve the most preferable oxygen permeability of 10 ml(STP)/m²·day·atm{Pa} or lower as measured under conditions of 30° C. and 80% RH (film thickness: 3 μm), it is only necessary to use heat-treating conditions satisfying the following relationship (e) in place of those satisfying the relationship (a):

(e) log t ≧ −0.0523×T+24.30.

wherein T satisfies the relationship (b).

The use of the heat-treating conditions satisfying the relationship (e) permits the provision of a film having an oxygen permeability constant (at 30° C., 80% RH) of $1.25 \times 10^{-4}$ ml(STP)·cm/m²·h·atm{Pa} or smaller.

The heat-treating temperature (T) is selected from a range of from 100° C. (373 K) to 300° C. (573 K). However, it takes a very long heat-treating time for obtaining a film high in oxygen gas barrier property if the heat-treating temperature falls within a lower temperature range, resulting in reduction of productivity. High oxygen gas barrier property can be achieved in a shorter heat-treating time as the heat-treating temperature becomes high. However, if the temperature is too high, there is a possibility that discoloration and/or decomposition may occur. Accordingly, the heat-treating temperature is controlled to a range of preferably from 120° C. (393 K) to 240° C. (513 K), more preferably 160° C. (433 K) to 230° C. (503 K).

By the way, it has been found that oxygen permeability under dry conditions (30° C., 0% RH, 3 μm in film thickness) is improved without any heat treatment simply by casting an aqueous solution of a mixture containing the PVA and the partially neutralized poly(meth)acrylic acid in a weight ratio within a range of from 60:40 to 10:90 into a dry film compared with a simple PVA film formed in the like way, and the oxygen permeability of the mixture film reaches the minimum value when the ratio of the PVA to the partially neutralized poly(meth)acrylic acid is 50:50 by weight. However, this dry film exhibits the excellent gas barrier performance only under low-humidity conditions like the simple PVA film. Under high-humidity conditions of 30° C. and 80% RH or higher, oxygen gas barrier performance is greatly impaired due to moisture absorption of the film, and moreover, the film is easy to dissolve in boiling water.

On the contrary, the use of the heat-treating conditions according to the present invention permits the provision of a water-resistant film exhibiting high oxygen gas barrier property, which has not been achieved to date, even under high-humidity conditions. As described above, U.S. Pat. No. 2,169,250 discloses a heat-treated film composed of a mixture of PVA and polymethacrylic acid. However, the heat-treating conditions in that document are only intended to form a crosslinked structure so as to insolubilize the film in water. If the heat-treating temperature and time specifically described in the document are applied to the mixture film according to the present invention, any film exhibiting high gas barrier property under high-humidity conditions can not be obtained. In this respect, the heat-treating conditions used in the present invention are new matter which has not been disclosed to date. Besides, films obtained under such conditions are also novel oxygen gas barrier films.

In the present invention, the partially neutralized product of poly(meth)acrylic acid is used. It is therefore possible to obtain a film inhibited in coloring due to the heat treatment compared with the case making use of unneutralized poly(meth)acrylic acid.

The gas barrier films according to the present invention exhibit high oxygen gas barrier property under high-humidity conditions, and are hence suitable for use particularly in the field of food packaging materials in the form of a single film or a laminate film with one or more other films.

ADVANTAGES OF THE INVENTION

PVA films have oxygen permeability greatly depending on humidity, and have hence been unsuitable for use under high-humidity conditions. Many proposals have been made for imparting water resistance to PVA films. However, such proposals are still insufficient from the viewpoint of fully keeping the excellent oxygen gas barrier property of the PVA film under dry conditions even under high-humidity conditions. The PVA films thus treated are difficult to use under conditions of higher temperature and humidity. On the contrary, the present invention permits the provision of films, which are formed from a mixture containing the PVA and the partially neutralized poly(meth)acrylic acid, good in water resistance and far excellent in gas barrier property under high-humidity conditions and moreover exhibit inhibited coloring, by using the specific heat-treating conditions.

The films according to the present invention are suitable for use, as food packaging materials, in packaging food and drink liable to be deteriorated by oxygen, for example, meat, processed meat products such as hams and sausages, juices, soda pop, etc.

EMBODIMENTS OF THE INVENTION

The present invention will hereinafter be described more specifically by the following examples and comparative examples. It should however be borne in mind that the present invention is not limited to the following examples only.

Example 1 and Comparative Example 1

Poval 105 (product of Kuraray Co., Ltd, trade name; saponification degree: 98.5%, average polymerization degree: 500) and a 25 wt. % aqueous solution of polyacrylic acid (product of Wako Pure Chemical Industries, Ltd., number average molecular weight: 150,000) were used as PVA and polyacrylic acid (PAA), respectively. Calculated amounts of sodium hydroxide were separately added to portions of the aqueous solution of PAA to prepare partially neutralized products (PAANas) of PAA having degrees of neutralization (DN) of 5%, 10% and 20%, respectively.

PVA and PAANa were mixed to give various weight ratios shown in Table 1 to prepare aqueous mixture solutions (polymer concentration: 10 wt. %). These mixture solutions were separately coated by using a Meyer bar on a stretched polyethylene terephthalate film (stretched PET film 16 μm thick), and water was then evaporated by a dryer, thereby obtaining dry films 3 μm thick. The stretched PET films on which these dry films had been respectively formed were subjected to a heat treatment at 200° C. for 15 minutes in an oven. Oxygen permeabilities measured under conditions of 30° C. and 80% RH on the heat-treated films (thickness: 3 μm) thus obtained are shown in Table 1.

For the sake of comparison, oxygen permeabilities of heat-treated films obtained by using PVA and unneutralized PAA (DN=0%) and treating mixtures thereof in the same manner as described above, a heat-treated film obtained by using PVA alone and treating it in the same manner as described above, and heat-treated films obtained by singly using PAANas which vary in degree of neutralization, and treating them in the same manner as described above are also shown collectively in Table 1. The results shown in Table 1 are also graphically illustrated in FIG. 1.

<Measurement of oxygen permeability>

The oxygen permeability of each of the heat-treated films was determined by separately measuring oxygen permeabilities of the stretched PET film as a support and a laminate (the stretched PET film on which the heat-treated film has been formed) by means of oxygen permeability testers, OX-TRAN (trade name) 2/20 and 100TWIN, both, manufactured by Modern Control Company, and calculating the oxygen permeability, Pfilm of the heat-treated film in accordance with the following equation:

$$1/P_{total} = 1/P_{film} + 1/P_{PET}$$

wherein $P_{total}$: oxygen permeability of the stretched PET film on which the heat-treated film has been laminated;

$P_{film}$: oxygen permeability of the heat-treated film; and $P_{PET}$: oxygen permeability of the stretched PET film.

<Water resistance>

The water resistance of each heat-treated film was evaluated by immersing the film in boiling water (95° C.) for 10 minutes and observing whether the film was soluble therein or not.

TABLE 1

| Composition (wt. %) | | Oxygen permeability (30° C., 80% RH, 3 μm) ml (STP)/m² · day · atm{Pa} | | | |
|---|---|---|---|---|---|
| PVA | PAANa | DN = 0% | DN = 5% | DN = 10% | DN = 20% |
| 100 | 0 | 100 | 100 | 100 | 100 |
| 90 | 10 | 39 | 49 | 64 | 180 |
| 80 | 20 | 19 | 14 | 22 | 120 |
| 70 | 30 | 19 | 6.6 | 5.5 | 120 |
| 60 | 40 | 21 | 3.0 | 1.3 | 79 |
| 50 | 50 | 16 | 2.2 | 0.7 | 40 |

TABLE 1-continued

| Composition (wt. %) | | Oxygen permeability (30° C., 80% RH, 3 μm) ml (STP)/m² · day · atm{Pa} | | | |
|---|---|---|---|---|---|
| PVA | PAANa | DN = 0% | DN = 5% | DN = 10% | DN = 20% |
| 40 | 60 | 16 | 2.5 | 0.3 | 28 |
| 30 | 70 | 17 | 0.7 | 0.1 | 35 |
| 20 | 80 | 35 | 1.2 | 0.5 | 53 |
| 10 | 90 | 1350 | 14 | 4.0 | 64 |
| 0 | 100 | >5000 | >5000 | >5000 | >5000 |

As apparent from Table 1, it is understood that films exhibiting excellent gas barrier property even under high-humidity conditions can be obtained in a weight ratio of PVA:PAANa ranging from 95:5 to 10:90, preferably from 90:10 to 10:90, more preferably from 80:20 to 20:80. The film obtained by using PVA alone, and the films obtained by singly using PAANas which varied in degree of neutralization were soluble in boiling water. All the heat-treated films other than these films were however insoluble in boiling water.

Example 2 and Comparative Example 2

In order to investigate the influence of humidity on oxygen permeability of heat-treated films, oxygen permeabilities of the heat-treated films (the films obtained by using PAANa of DN=10%) obtained in Example 1 and Comparative Example 1 were measured under conditions of (1) 30° C. and 0% RH (dry) and (2) 30° C. and 100% RH. The results are shown in Table 2.

Incidentally, the oxygen permeabilities described in Example 1 and Comparative Example 1 and measured under conditions of (3) 30° C. and 80% RH are also shown collectively in Table 2.

TABLE 2

| Composition (wt. %) | | Oxygen permeability (30° C., 3 μm) ml (STP)/m² · day · atm{Pa} | | |
|---|---|---|---|---|
| PVA | PAANa | Dry | 80% RH | 100% RH |
| 100 | 0 | 1.2 | 100 | 1820 |
| 90 | 10 | 1.5 | 64 | 800 |
| 80 | 20 | 0.3 | 22 | 280 |
| 70 | 30 | 1.4 | 5.5 | 79 |
| 60 | 40 | 0.1 | 1.3 | 13 |
| 50 | 50 | 0.1 | 0.7 | 5.7 |
| 30 | 70 | 0.1 | 0.1 | 1.5 |
| 10 | 90 | 0.6 | 4.0 | 35 |
| 0 | 100 | 1.2 | >5000 | N.D. |

(Note) N.D. means that the measurement of the oxygen permeability was impossible because the oxygen permeability of the stretched PET film as a support was close to the oxygen permeability of the stretched PET film on which the heat-treated film had been coated.

As apparent from the data shown in Table 2, it is understood that the films according to the present invention exhibit excellent oxygen gas barrier property under the high-humidity conditions, to say nothing of under the dry conditions. In particular, films exhibiting excellent oxygen gas barrier property even under extremely high-humidity conditions of 30° C. and 80% RH or 30° C. and 100% RH can be obtained if the partially neutralized product of PAA is contained in a range of 20–80 wt. %, more preferably 30–70 wt. %.

Example 3 and Comparative Example 3

In order to investigate the inhibitory effect of the present invention on coloring, absorbance at 400 nm was measured by a spectrophotometer for ultraviolet and visible region, UV-2200 (trade name, manufactured by Shimadzu Corporation) on those of the compositional ratios shown in Table 3 among the heat-treated films obtained in Example 1, thereby evaluating the films in degree of coloring.

The measurement was performed by setting the stretched PET film on which the heat-treated film had been formed (laminate) and the stretched PET film (thickness: 16 μm), which had been subjected to a heat treatment at 200° C. for 15 minutes, on the sample side and the control side, respectively, of the spectrophotometer.

Further, the measurement was conducted in the same manner as described above on those of the compositional ratios shown in Table 3 among the heat-treated films obtained in Comparative Example 1 and formed of PVA and unneutralized PAA (DN=0%), the film obtained by using PVA alone, and the films obtained by singly using PAANas which varied in degree of neutralization (Comparative Example).

The measurement results of absorbance at 400 nm of the films are shown in Table 3.

TABLE 3

| Compositional ratio (wt. %) | | Degree of neutralization | | | |
|---|---|---|---|---|---|
| PVA | PAANa | DN = 0% | DN = 5% | DN = 10% | DN = 20% |
| 100 | 0 | 0.040 | 0.040 | 0.040 | 0.040 |
| 80 | 20 | 0.030 | 0.028 | 0.018 | 0.008 |
| 60 | 40 | 0.055 | 0.040 | 0.049 | 0.020 |
| 40 | 60 | 0.090 | 0.072 | 0.038 | 0.001 |
| 20 | 80 | 0.120 | 0.108 | 0.055 | 0.001 |
| 0 | 100 | 0.001 | 0.001 | 0.001 | 0.001 |

In a region (near ultraviolet and visible light region) from 190 nm to 600 nm, the absorption at 400 nm is considered to be absorption attributable to a polyene structure. As apparent from Table 3, it is therefore understood that the neutralization of PAA makes the absorbances at 400 nm of the films small, and the degree of coloring is thus improved.

Example 4 and Comparative Example 4

A 10 wt. % aqueous mixture solution containing PVA and PAANa (DN=10%) in a weight ratio of 30:70 was prepared in the same manner as in Example 1. The resultant aqueous mixture solution was coated by using a Meyer bar on a stretched PET film (16 μm thick), and water was then evaporated by a dryer, thereby obtaining a dry film 3 μm thick. Portions of the stretched PET film on which this dry film had been formed were separately subjected to a heat treatment with heat-treating temperature and heat-treating time varied as shown in Table 4. The oxygen permeability (at 30° C. and 80% RH) of each of the heat-treated film portions was measured. The results are shown in Table 4. With respect to the data shown in Table 4, the relationship between the heat-treating time and the oxygen permeability in each of the heat-treating temperatures is graphically illustrated in FIG. 2.

TABLE 4

| Heat-treating conditions | | Oxygen permeability ml (STP)/m$^2$ · day · atm{Pa} |
|---|---|---|
| Temperature | Time | (30° C., 80% RH, 3 μm) |
| 120° C. | 2 hours | N.D. |
| | 4 hours | N.D. |
| | 8 hours | 1000 |
| | 16 hours | 400 |
| | 32 hours | 54 |
| 140° C. | 1 hour | 430 |
| | 2 hours | 190 |
| | 4 hours | 40 |
| | 8 hours | 11 |
| | 16 hours | 3.3 |
| 160° C. | 30 minutes | 7.4 |
| | 1 hour | 3.2 |
| | 2 hours | 0.83 |
| | 4 hours | 0.44 |
| 180° C. | 15 minutes | 2.9 |
| | 30 minutes | 0.44 |
| | 1 hour | 0.38 |
| | 2 hours | 0.17 |
| 200° C. | 10 minutes | 0.4 |
| | 15 minutes | 0.1 |

(Note) N.D. means that the measurement was impossible because the oxygen permeability of the stretched PET film as a support was close to the oxygen permeability of the stretched PET film on which the heat-treated film had been coated.

With respect to the relationship between oxygen permeability (P) and heat-treating time (t: min), a linear regression line between log P and log t was first prepared in each heat-treating temperature from the data shown in Table 4 in accordance with a method known per se in the art. In each heat-treating temperature, heat-treating time, log t for which the oxygen permeability came to 0.1, 1.0, 5.0, 10, 50, 100, 500 or 1000 ml(STP)/m$^2$·day·atm{Pa} was then calculated out. Further, a linear regression line as to the relationship between the heat-treating temperature (T) and log t was prepared on the basis of this calculated result. On the other hand, as shown in Table 1, a film exhibiting an oxygen permeability of 100 ml(STp)/m$^2$·day·atm{Pa} at 30° C. and 80% RH is provided when a PVA film (3 μm thick) is heat-treated at 200° C. for 15 minutes. Accordingly, heat-treating conditions under which the oxygen permeability came to 100 ml(STP)/m$^2$·day·atm{Pa} or lower were found from the results of the regression analysis obtained above. As a result, the following relationship was found.

$\log t \geq -0.0582 \times T + 26.06$ wherein t means the heat-treating time (min), and T denotes the heat-treating temperature (K).

Taking the coloring of the film, the decomposition-melting of the polymer components, etc. into consideration, the range of the heat-treating temperature comes to $373 \leq T \leq 573$.

The use of these heat-treating conditions permits the provision of films each exhibiting an oxygen permeability lower than that of the simple PVA film, namely, films improved in gas barrier property as demonstrated by an oxygen permeability constant of $1.25 \times 10^{-3}$ ml(STP)·cm/m$^2$·h·atm{Pa} or smaller as measured under conditions of 30° C. and 80% RH.

Example 5 and Comparative Example 5

Neutralizers shown in Table 5 were separately used to partially neutralize PAA by 5%, 10% or 20%. Aqueous mixture solutions (concentration: 10 wt. %) containing PVA and each of partially neutralized products of PAA shown in Table 5 in a weight ratio of 30:70 were prepared in the same manner as in Example 1, followed by formation of films on stretched PET films from these solutions. The thus-formed films were heat-treated at 200° C. for 15 minutes, thereby producing heat-treated films.

Oxygen permeabilities (at 30° C. and 80% RH) of the resulting films were measured. The results are shown in Table 5.

TABLE 5

| Neutralizer | Degree of neutralization (%) | Oxygen permeability (30° C., 80% RH, 3 μm) ml (STP)/m$^2$ · day · atm{Pa} | |
|---|---|---|---|
| | | Example | Comp. Example |
| NaOH | 5 | 0.7 | — |
| | 10 | 0.1 | — |
| | 20 | 35 | — |
| LiOH | 5 | 0.6 | — |
| | 10 | 0.1 | — |
| | 20 | 35 | — |
| KOH | 5 | 0.7 | — |
| | 10 | 0.1 | — |
| | 20 | 33 | — |
| NH$_4$OH | 5 | 1.0 | — |
| | 10 | 0.2 | — |
| | 20 | 38 | — |
| Not neutralized | — | — | 17 |

Example 6 and Comparative Example 6

The same PVA as that used in Example 1 and a 20 wt. % aqueous solution of polymethacrylic acid (AC-30H) (product of NIHON JUNYAKU Co., Ltd., number average molecular weight: 50,000) were used as PVA and polymethacrylic acid (PMAA), respectively. A calculated amount of sodium hydroxide was added to the aqueous solution of PMAA to prepare a partially neutralized product (PMAANa) of PMAA having a degree of neutralization of 10%.

PVA and PMAANa were then mixed in a weight ratio of 80:20 to prepare an aqueous mixture solution (concentration: 10 wt. %). Using this mixture solution, a dry film 3 μm thick was formed in the same manner as in Example 1. The dry film thus formed was subjected to a heat treatment at 200° C. for 15 minutes to obtain a heat-treated film.

This film had an oxygen permeability (at 30° C. and 80% RH) of 20 ml(STP)/m$^2$·day·atm{Pa} and an absorbance of 0.001 at 400 nm, and was insoluble in boiling water.

On the other hand, a heat-treated film obtained as a comparative example by using PVA and unneutralized PMAA and treating an aqueous mixture solution thereof in the same manner as described above had an oxygen permeability (at 30° C. and 80% RH) of 31 ml(STP)/m$^2$·day·atm{Pa} and an absorbance of 0.002 at 400 nm, and was insoluble in boiling water.

We claim:

1. A gas barrier film formed from a mixture containing polyvinyl alcohol and a partially neutralized product of poly(meth) acrylic acid having a degree of neutralization within a range of 0.1–20% in a weight ratio of 95:5 to 10:90, and having an oxygen permeability constant of 1.25×10$^{-3}$ ml(STP)·cm/m$^2$·h·atm{Pa} or smaller as measured under conditions of 30° C. and 80% relative humidity and being insoluble in boiling water, said degree of neutralization being determined by the following equation:

Degree of neutralization=(A/B)×100 wherein A means the total number of moles of carboxyl groups neutralized in 1 g of the partially neutralized poly(meth) acrylic acid, and B denotes the total number of moles of carboxyl groups in 1 g of the poly(meth)acrylic acid before the partial neutralization.

2. The gas barrier film as claimed in claim 1, wherein the polyvinyl alcohol has a saponification degree of at least 95% and an average polymerization degree ranging from 300 to 2,500.

3. The gas barrier film as claimed in claim 1, wherein the poly(meth)acrylic acid is polyacrylic acid, polymethacrylic acid, a copolymer of acrylic acid and methacrylic acid, or a mixture of at least two polymers thereof, and has a number average molecular weight ranging from 2,000 to 250,000.

4. The gas barrier film as claimed in claim 1, wherein the partially neutralized product of poly(meth)acrylic acid is obtained by partially neutralizing carboxyl groups of the poly(meth)acrylic acid with an alkali.

5. The gas barrier film as claimed in claim 1, wherein the partially neutralized product of poly(meth)acrylic acid has a degree of neutralization within a range of 3–15%.

6. The gas barrier film as claimed in claim 1, wherein the film is formed from a mixture containing the polyvinyl alcohol and the partially neutralized product of poly(meth)acrylic acid in a weight ratio of 90:10 to 10:90.

7. The gas barrier film as claimed in claim 1, wherein the film is formed from a mixture containing the polyvinyl alcohol and the partially neutralized product of poly(meth)acrylic acid in a weight ratio of 80:20 to 20:80.

8. The gas barrier film as claimed in claim 1, wherein the oxygen permeability constant is 6.25×10$^{-4}$ ml(STP)·cm/m$^2$·h·atm{Pa} or smaller as measured under conditions of 30° C. and 80% relative humidity.

9. The gas barrier film as claimed in claim 1, wherein the oxygen permeability constant is 3.13×10$^{-4}$ ml(STP)·cm/m$^2$·h·atm{Pa{ or smaller as measured under conditions of 30° C. and 80% relative humidity.

10. The gas barrier film as claimed in claim 1, wherein the oxygen permeability constant is 1.25×10$^{-4}$ ml(STP)·cm/m$^2$·h·atm{Pa} or smaller as measured under conditions of 30° C. and 80% relative humidity.

11. A process for the production of a gas barrier film, which comprises forming a film from a mixture containing polyvinyl alcohol and a partially neutralized product of poly(meth)acrylic acid having a degree of neutralization within a range of 0.1–20% in a weight ratio of 95:5 to 10:90, and then subjecting the film to a heat treatment under the conditions in which the heat-treating temperature and the heat-treating time satisfy the following relationships (a) and (b):

(a) log t≧−0.0582×T+26.06

(b) 373≦T≦573 wherein t means the heat-treating time (min), and T denotes the heat-treating temperature (K), said degree of neutralization being determined by the following equation:

Degree of neutralization=(A/B)×100 wherein A means the total number of moles of carboxyl groups neutralized in 1 g of the partially neutralized poly(meth) acrylic acid, and B denotes the total number of moles of carboxyl groups in 1 g of the poly(meth)acrylic acid before the partial neutralization.

12. The process as claimed in claim 11, wherein the polyvinyl alcohol has a saponification degree of at least 95% and an average polymerization degree ranging from 300 to 2,500.

13. The process as claimed in claim 11, wherein the poly(meth)acrylic acid is polyacrylic acid, polymethacrylic acid, a copolymer of acrylic acid and methacrylic acid, or a mixture of at least two polymers thereof, and has a number average molecular weight ranging from 2,000 to 250,000.

14. The process as claimed in claim 11, wherein the partially neutralized product of poly(meth)acrylic acid is obtained by partially neutralizing carboxyl groups of the poly(meth)acrylic acid with an alkali.

15. The process as claimed in claim 11, wherein the partially neutralized product of poly(meth)acrylic acid has a degree of neutralization within a range of 3–15%.

16. The process as claimed in claim 11, wherein the film is formed from a mixture containing the polyvinyl alcohol and the partially neutralized product of poly(meth)acrylic acid in a weight ratio of 90:10 to 10:90.

17. The process as claimed in claim 11, wherein the film is formed from a mixture containing the polyvinyl alcohol and the partially neutralized product of poly(meth)acrylic acid in a weight ratio of 80:20 to 20:80.

18. The process as claimed in claim 11, wherein the film is formed by a solvent casting process from an aqueous solution of the mixture containing the polyvinyl alcohol and the partially neutralized product of poly(meth)acrylic acid.

19. The process as claimed in claim 11, wherein the film formed from the mixture containing the polyvinyl alcohol and the partially neutralized product of poly(meth)acrylic acid is subjected to a heat treatment under conditions in which the heat-treating temperature and the heat-treating time satisfy the following relationships (c) and (b):

(c) $\log t \geq -0.0547 \times T + 25.53$ (b) $373 \leq T \leq 573$.

20. The process as claimed in claim 11, wherein the film formed from the mixture containing the polyvinyl alcohol and the partially neutralized product of poly(meth)acrylic acid is subjected to a heat treatment under conditions in which the heat-treating temperature and the heat-treating time satisfy the following relationships (d) and (b):

(d) $\log t \geq -0.0547 \times T + 25.00$ (b) $373 \leq T \leq 573$.

21. The process as claimed in claim 11, wherein the film formed from the mixture containing the polyvinyl alcohol and the partially neutralized product of poly(meth)acrylic acid is subjected to a heat treatment under conditions in which the heat-treating temperature and the heat-treating time satisfy the following relationships (e) and (b):

(e) $\log t \geq -0.0523 \times T + 24.30$ (b) $373 \leq T \leq 573$.

* * * * *